United States Patent Office 3,780,185
Patented Dec. 18, 1973

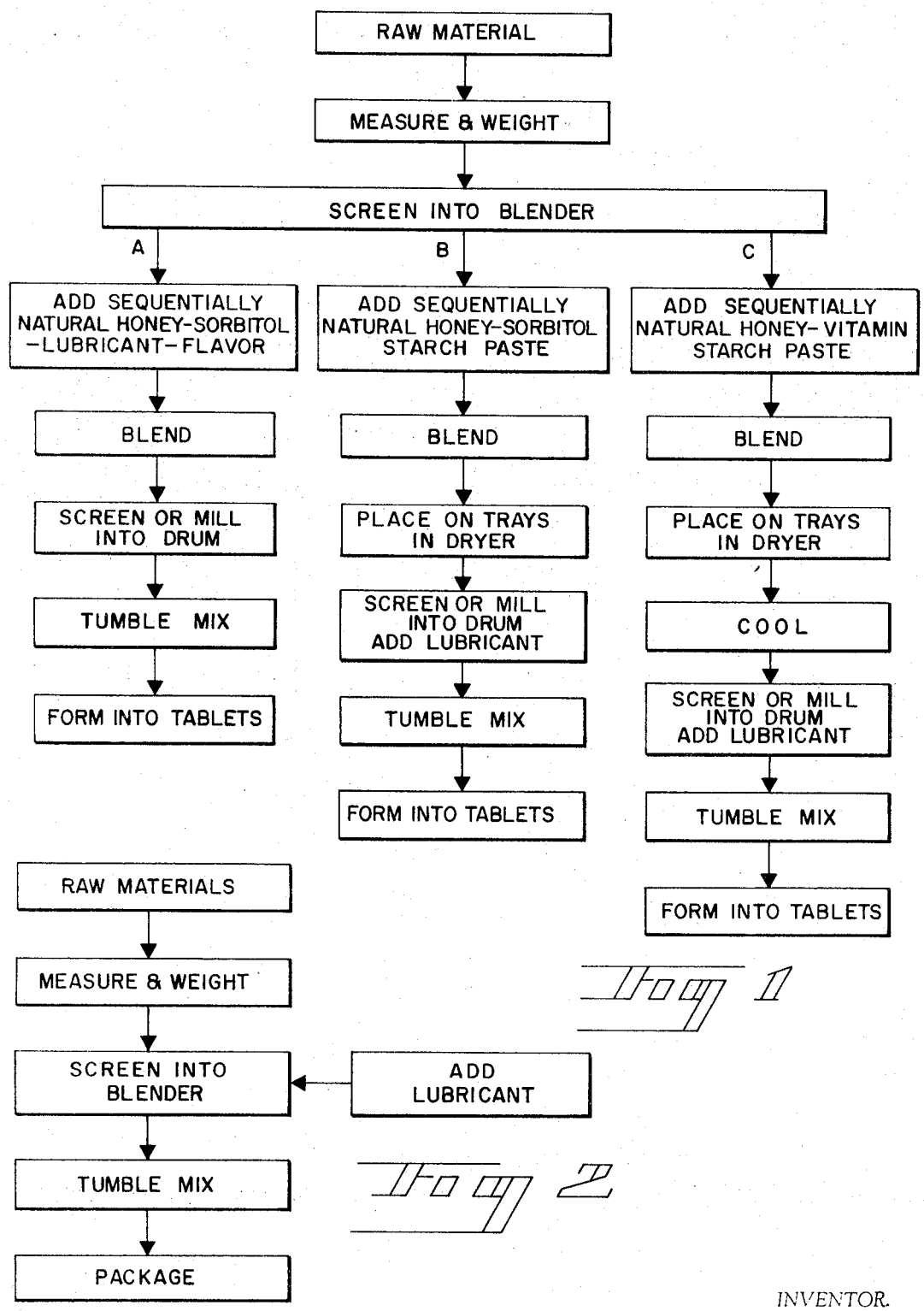

3,780,185
COMPOSITION OF MATTER INCLUDING
DRIED HONEY
Murray E. Fields, Phoenix, Ariz., assignor to Honey Tein
Products, Inc., Phoenix, Ariz.
Filed Sept. 30, 1970, Ser. No. 76,755
Int. Cl. A23l 1/08, 1/26
U.S. Cl. 426—72
14 Claims

ABSTRACT OF THE DISCLOSURE

A non-sticky product embodying honey is prepared by admixing, blending and screening soy protein isolate, non-fat dried milk, sugar and dried honey. Sorbitol and natural honey are then added and the resultant mixture is blended, screened and tumble mixed. The product may be formed into tablets or wafers.

BACKGROUND OF THE INVENTION

This invention is related to food in pure dried powder or granulated form and more particularly to stable easily handled and stored forms of honey based products and the process of preparing the same.

FIELD OF THE INVENTION

Dried products today are mainly thought of as convenience foods and convenience is practically synonymous with instant reconstitution. However, some food products like honey may be transformed or reconstituted to a different form or composition of matter by drying, among other things, which makes the new product easier to handle and useful in many more food combinations. Unless the dried food product is very similar in characteristics to its normal taste and flavor there is little justification in processing it to its powdered or granulated form. This has been a problem in the prior art.

DESCRIPTION OF THE PRIOR ART

Perhaps the greatest advantage of dried food products over other forms of the product is its relatively long storage life at ordinary temperatures and its reduction in both weight and volume. With sticky products such as honey, molasses and the like drying the product to a powdered or granular state also involves the removal of this sticky characteristic. Although drying honey has been attempted and accomplished to a reasonable degree of satisfaction the utilization of this dried product with other dried food products in pill, wafer or powdered mixture form has not been accomplished.

SUMMARY OF THE INVENTION

In accordance with the invention claimed a new and improved composition of matter is provided which may be used in different forms to enrich foods with flavor and nutritional values. Extensive changes have taken place in the technology of drying food products and in the nutritional assistance powder or granulated food supplements have provided other food products. Although many dried products have been provided for reconstitution at a later date many dried products such as powdered honey may be added to other products for flavor, nutritional assistance, or when added with basic food products used as a food suplement. Accordingly a new and improved product or composition of matter has been provided which has heretofore been unknown in the disclosed state.

It is, therefore, one object of this invention to provide a new and improved composition of matter utilizing, inter alia, dried honey.

Another object of this invention is to provide an improved dry food product including honey.

A further object of this invention is to provide a new and improved composition of matter in wafer from utilizing dried honey.

A still further object of this invention is to provide a new method for the manufacture of a dried honey product which may be easily controlled and regulated to attain uniform results under efficient methods of operation.

Further objects and advantages of the invention will become apparent as the following description proceeds and the features of novelty which characterizes this invention will be pointed out with particularity in the claims annexed to and forming part of this specification.

BRIEF DESCRIPTION OF THE DRAWING

The present invention may be more readily described by reference to the accompanying drawing in which:

FIG. 1 is a flow diagram for the manufacture of dried honey products in tablet form and embodying the invention; and FIG. 2 is a flow diagram for the manufacture of dried honey products in powder or granulated form.

DESCRIPTION OF PREFERRED EMBODIMENT

Referring more particularly to the drawing by characters of reference, FIG. 1 discloses a flow diagram showing the method or process of making new compositions of matter embodying honey in a concentrated dry state. The method or process disclosed mixes the ingredients in a new way such that the raw materials when mixed have a coherency which facilitates packaging and handling. Coherence is influenced by moisture content, temperature and means of applying pressure during packaging. Since many foods tend to expand after removal from a press, thereby reducing cohesiveness, they tend to fall apart. Thus, the method of forming the product is extremely important. This is particularly true where a wet, sticky ingredient such as natural honey is used in forming a powder or granulated product.

So far as is known this is the first group of products manufactured utilizing dried and natural honey to obtain a powder or tablet product retaining substantially the full food values of the original honey. Since the resultant product is free of any carrier it can be readily incorporated with other foods by mixture in direct proportions.

In carrying out the method of this invention the raw materials are measured, weighed and screened into a blender. The three products disclosed in FIG. 1 are formed by three different methods A, B and C which all utilize the same basic raw materials, namely soy protein isolate, non-fat dry milk, granulated sugar, dried honey and brownulated sugar.

In practice of this invention for process A, a mixture of, for example, 100 pounds of soy protein isolate, 752 grams of non-fat milk, 500 grams of granulated sugar, 56 pounds of dried honey may be mixtd with 58 pounds of brownulated sugar. This mixture is passed through a number 3 screen with a 12–14 mesh size. The size of particles is designated by microns or mesh. A micron is 0.001 mm. Mesh refers to the number of screen openings per lineal inch. The openings also depend upon the wire size used in making the mesh material. One hundred thousand wafers may be made from this combination of ingredients.

After passing through a 12, 13 or 14 mesh size screen the raw material is mixed thoroughly in a blender. In accordance with process A, natural honey is added to the mixture a drop at a time until from 1000 to 1250 grams of wet honey has been used. At this time 25 to 31 pounds of a sorbitol solution is added to the mixture. If necessary a suitable lubricant such as magnesium stearate may be added to the mixture together with flavoring such as butterscotch, strawberry, vanilla and the like. This mixture is slowly mixed and further blended to avoid lumping.

The material is again screened or milled sufficiently to pass through a 12–14 mesh screen into a drum within which the mixture is tumbled for twenty minutes or until the material is sufficiently blended to form a uniform product. This product is then transmitted to a tablet forming machine in a well known manner, for compressing into suitable wafer or tablet form after which it is packaged for the consumer market.

If it is desired to form a more granulated product than that resulting from process A described above, process B may be used. This process is substantially the same as illustrated and described for process A except that six pounds of a starch paste is added to the mixture of raw material sequentially with the natural honey and sorbitol. The starch paste may be a mixture of one pound of corn starch to one gallon of water. After the raw materials including the natural honey, sorbitol and starch paste have been blended together, the mixture is placed on trays in a dryer having a temperature ranging from approximately 90 to 120 degrees Fahrenheit and kept at that temperature for approximately 8 hours. After the drying period the mixture is screened or milled to pass through a 12–14 mesh screen and approximately 3000 to 3750 grams of magnesium stearate is added to the mixture for lubricating purposes. The mixture is then tumbled in a drum and transmitted to a tablet forming machine where it is formed into tablets, wafers, or the like and packaged for sale.

Process C is substantially identical to processes A and B except that the raw material after blending are sequentially mixed with natural honey, starch paste and vitamin E. To effectively add vitamin E to the solution approximately 3000 grams of vitamin E succinate is used. This mixture is then blended, placed on trays and dried as in process B. The material is then cooled, screened, mixed with a suitable lubricant such as magnesium stearate and tumble mixed before it is formed into tablets or wafers before packaging. It should be recognized that other vitamins may be added with vitamin E or in place thereof.

FIG. 2 illustrates a further dried honey product wherein the raw material comprising dried honey is mixed with brownulated sugar and flavoring to form a powdered product which may be shook like salt or pepper on other foods. In order to prevent any caking of the product under moist conditions a suitable lubricant such as magnesium stearate may be used. One suitable product utilizes 62 percent of dried honey, 31 percent of brownulated sugar, 6.5 percent of cocoa powder and 0.15 percent of ammoniated powdered glycyrrhizin. Other flavor powdered dried honey products may be formed by mixing approximately 150 pounds of dried honey with 90 pounds of brownulated sugar. Approximately 1090 grams of a suitable flavor such as butterscotch or strawberry is added to the mixture which is when mixed with a lubricant screened through a 12–14 mesh screen, tumble mixed for about 20 minutes and packaged.

Although but a few embodiments of the present invention have been illustrated and described, it will be appareint to those skilled in the art that various changes and modifications may be made therein without departing from the spirit of the invention or from the scope of the appended claims.

What is claimed is:

1. The method of preparing a product embodying honey in a dried form comprising the steps of mixing first ingredients comprising about 100 pounds of soy protein isolate with about 61 pounds of non-fat dried milk and sugar and about 56 pounds of dried honey, blending said first ingredients until they pass through a 12 to 14 mesh screen, sequentially adding about 1000 grams of natural honey and about 25 pounds of sorbitol to said first ingredients while blending, said natural honey being added a drop at a time, further blending said second ingredients comprising all the ingredients forming the product to remove all lumps, screening said second ingredients through a 12 to 14 mesh screen, tumble mixing said second ingredients, and forming said second ingredients into tablet forms.

2. The method of claim 1 wherein said soy protein isolate comprises at least one third of the final weight of the product.

3. The method of claim 1 wherein said second ingredients are screened through a 12 mesh screen before tumble mixing and forming into tablet form.

4. The method of claim 1 wherein said first ingredients are sequentially mixed with by weight approximately 25 percent of natural honey, sorbitol, a lubricant and a flavor.

5. The method of claim 1 wherein a lubricant comprising magnesium stearate is sequentially added to said second ingredient containing natural honey.

6. The method of claim 1 wherein a starch paste is sequentially added to said second ingredients containing natural honey and sorbitol and wherein said second ingredients after blending are dried before tumbling and placing into tablet form.

7. The method of claim 6 wherein said second ingredients are dried to a temperature of approximately 90 to 120 degrees Fahrenheit.

8. The method of claim 6 wherein said second ingredients are further mixed sequentially with a given amount of vitamin E.

9. The method of claim 6 wherein said second ingredients are further mixed sequentially with a vitamin.

10. A tabletable composition of matter comprising approximately 100 pounds of soy protein isolate, 752 grams of non-fat milk, 500 grams of granulated sugar, 56 pounds of dried honey, 58 pounds of brownulated sugar, and a suitable flavoring.

11. The composition of matter set forth in claim 10 in further combination with at least 1000 grams of wet honey.

12. The tabletable composition of matter set forth in claim 10 in further combination with a vitamin.

13. The tabletable composition of matter set forth in claim 12 wherein said vitamin comprises vitamin E.

14. The method of preparing a product embodying honey in a dried form comprising the steps of mixing first ingredients comprising by weight, about 35 percent of soy protein isolate with by weight about 45 percent of non-fat dried milk and sugar, blending said first ingredients until they pass through a substantially 12 mesh screen, sequentially adding by weight about 20 percent of honey and sorbitol to said first ingredients while blending to form said second ingredients, further blending said second ingredients to remove all lumps, screening said second ingredients through a substantially 12 mesh screen, tumble mixing said second ingredients, and forming said second ingredients into tablet forms.

References Cited

UNITED STATES PATENTS

| | | | |
|---|---|---|---|
| 2,621,128 | 12/1952 | Webb et al. | 99—146 |
| 2,693,420 | 11/1954 | Straub | 99—146 |
| 3,244,528 | 4/1966 | Torr | 99—146 X |

FOREIGN PATENTS 392,009 5/1933 Great Britain.

MORRIS O. WOLK, Primary Examiner

S. MARANTZ, Assistant Examiner

U.S. Cl. X.R.

424—284; 426— 147, 212, 214, 221, 380, 512